US012692013B2

(12) United States Patent　　　(10) Patent No.:　US 12,692,013 B2

Marathe et al.　　　(45) Date of Patent:　　Jul. 28, 2026

(54) SYSTEMS AND METHODS FOR ASSESSING FATIGUE OF PILOT OF AIRCRAFT

(71) Applicant: THE BOEING COMPANY, Arlington, VA (US)

(72) Inventors: Anket Hirachand Marathe, Bangalore (IN); Achint Jain, Bangalore (IN); Christopher Van Geystel, Charleston, SC (US)

(73) Assignee: The Boeing Company, Arlington, VA (US)

( * ) Notice: Subject to any disclaimer, the term of this patent is extended or adjusted under 35 U.S.C. 154(b) by 116 days.

(21) Appl. No.: 18/407,665

(22) Filed: Jan. 9, 2024

(65) Prior Publication Data

US 2025/0223051 A1　　Jul. 10, 2025

(51) Int. Cl.
B64D 43/00　　　(2006.01)
G06N 20/00　　　(2019.01)

(52) U.S. Cl.
CPC ............. B64D 43/00 (2013.01); G06N 20/00 (2019.01)

(58) Field of Classification Search
CPC .................................................... B64D 43/00
See application file for complete search history.

(56) References Cited

U.S. PATENT DOCUMENTS

| | | | |
|---|---|---|---|
| 8,738,523 B1 * | 5/2014 | Sanchez ................. | G06Q 40/00 |
| | | | 705/4 |
| 11,479,365 B2 * | 10/2022 | Chen ...................... | G06V 20/64 |

| | | | |
|---|---|---|---|
| 2017/0123215 A1 * | 5/2017 | Li ........................ | H04N 13/383 |
| 2019/0090800 A1 | 3/2019 | Bosworth | |
| 2020/0290740 A1 | 9/2020 | Rangan | |
| 2021/0005224 A1 * | 1/2021 | Rothschild ........... | H04N 9/8205 |
| 2021/0251554 A1 * | 8/2021 | Tal ........................ | G16H 50/20 |
| 2021/0346806 A1 * | 11/2021 | Pardeshi ................ | G06N 3/047 |
| 2022/0101734 A1 * | 3/2022 | Crouch .................. | G06F 3/0482 |
| 2022/0117528 A1 * | 4/2022 | Martucci .............. | A61B 5/4088 |
| 2023/0021088 A1 * | 1/2023 | V ......................... | G06F 3/04895 |
| 2023/0073916 A1 | 3/2023 | Sarkar | |
| 2023/0215279 A1 * | 7/2023 | Sampath ............... | G06F 40/205 |
| | | | 701/120 |

(Continued)

FOREIGN PATENT DOCUMENTS

| | | | | |
|---|---|---|---|---|
| DE | 102021112107 A1 * | 11/2021 | ........... | G06F 18/214 |
| EP | 3229220 A1 * | 10/2017 | ........... | G09B 19/165 |

OTHER PUBLICATIONS

NPL, Urbanowicz, Ryan J.; Moore, Jason H. (Sep. 22, 2009). "Learning Classifier Systems: A Complete Introduction, Review, and Roadmap". Journal of Artificial Evolution and Applications. 2009: 1-25. doi:10.1155/2009/736398.*

(Continued)

*Primary Examiner* — Jean Paul Cass

(74) *Attorney, Agent, or Firm* — Joseph M. Butscher; Carroll. Hoette & Butscher, LLC

(57)　　　ABSTRACT

A system and a method include an artificial intelligence (AI) control unit configured to: receive a schedule for a pilot of an aircraft, receive survey answer data from the pilot, use one or more machine learning models to analyze the schedule and the survey answer data, and assess a readiness level of the pilot based on the schedule and the survey answer data. The aircraft is operated in accordance with the readiness level as assessed by the AI control unit.

21 Claims, 5 Drawing Sheets

(56)  References Cited

U.S. PATENT DOCUMENTS

2023/0392954 A1* 12/2023 Rao .......................... G08G 5/21

OTHER PUBLICATIONS

Akerstedt, T., & Wright, K. P. (2009). Sleep Loss and Fatigue in Shift Work and Shift Work Disorder. Sleep Medicine Clinics, 4(2), 257-271.
Basner, M., & Dinges, D. F. (2011). Maximizing Sensitivity of the Psychomotor Vigilance Test (PVT) to Sleep Loss. Sleep, 34(5), 581-591.
Dorrian, J., Baulk, S. D., & Dawson, D. (2011). Work Hours, Workload, Sleep and Fatigue in Australian Rail Industry Employees. Applied Ergonomics, 42(2), 202-209.
Gander, P., Graeber, R. C., & Connell, L. J. (2013). Fatigue Risk Management: Organizational Factors at the Regulatory and Industry/Company Level. Accident Analysis & Prevention, 43(2), 573-590.
Goode, J. H. (2003). Are pilots at risk of accidents due to fatigue? Journal of Safety Research, 34(3), 309-313.
Van Dongen HPA, Maislin G, Dinges DF. Dealing with interindividual differences in the temporal dynamics of fatigue and performance: importance and techniques. Aviat Space Environ Med 2004; 75(3, Suppl.):A147-54.
Wierwille, W. W., & Ellsworth, L. A. (1994). Evaluation of driver drowsiness by trained raters. Accident Analysis & Prevention, 26(5), 571-581.
Extended European Search Report for EP 24223004.3-1218, dated Apr. 29, 2025.

* cited by examiner

Receive a schedule for a pilot of an aircraft  — 200

Receive survey answer data from the pilot  — 202

Use one or more machine learning models to analyze the schedule and the survey answer data  — 204

Assess a readiness level of the pilot from the analysis of the schedule and the survey answer data  — 206

SYSTEMS AND METHODS FOR ASSESSING FATIGUE OF PILOT OF AIRCRAFT

FIELD OF THE DISCLOSURE

Examples of the present disclosure generally relate to systems and methods for assessing readiness of a pilot of an aircraft.

BACKGROUND OF THE DISCLOSURE

Aircraft transport passengers and cargo between various locations. Numerous aircraft depart from and arrive at a typical airport every day.

Pilots operate aircraft according to schedules. That is, a flight schedule includes dates and times for pilots to operate the aircraft between different airports. As can be appreciated, a pilot may experience fatigue if scheduled to fly too many times in a short period of time.

Pilot readiness to fly (such as a level of restfulness, fatigue, and/or the like) is relevant to flight operations. For example, a high level of fatigue can lead to decreased performance, poor decision making, and an increased risk of accidents. Several factors contribute to pilot readiness, including a time of day, a duration of a flight, a number of time zones crossed, and/or the like. Additionally, individual differences such as sleep patterns, sleep disorders, and stress levels can also contribute to pilot fatigue.

Current self-assessment processes for pilot fatigue are rudimentary, often relying on a single question asking the pilot about a perceived readiness level. Traditional fatigue risk management tools, while effective in some contexts, may not adequately address unique needs of pilots.

SUMMARY OF THE DISCLOSURE

A need exists for a system and a method for accurately assessing pilot readiness. Further, a need exists for tailored approach to predict and pilot readiness.

With those needs in mind, certain examples of the present disclosure provide a system including an artificial intelligence (AI) control unit configured to receive a schedule for a pilot of an aircraft, receive survey answer data from the pilot, use one or more machine learning models to analyze the schedule and the survey answer data, and assess a readiness level of the pilot based on the schedule and the survey answer data. The aircraft is operated in accordance with the readiness level as assessed by the AI control unit.

In at least one example, the system also includes a user interface in communication with the AI control unit. The user interface includes a display in communication with an input device. The AI control unit shows one or more surveys on the display. Answers to questions within the one or more surveys are input by the pilot via the input device. The survey answer data includes the answers. The user interface can be onboard the aircraft.

The system can include a survey database in communication with the AI control unit. The survey database stores survey data including the one or more surveys.

The system can include a schedule database in communication with the AI control unit. The schedule database stores schedule data including the schedule.

The system can include a model database in communication with the AI control unit. The model database stores the one or more machine learning models.

In at least one example, the one or more machine learning models can include a plurality of machine learning models.

The AI control unit can be further configured to select results of one of the plurality of machine learning models based on an assessed reliability.

In at least one example, the one or more machine learning models include a voting classifier model.

The AI control unit can be further configured to automatically operate one or more aspects the aircraft based on the readiness level as assessed by the AI control unit.

Certain examples of the present disclosure provide a method including receiving, by an artificial intelligence (AI) control unit, a schedule for a pilot of an aircraft; receiving, by the AI control unit, survey answer data from the pilot; using, by the AI control unit, one or more machine learning models to analyze the schedule and the survey answer data; and assessing, by the AI control unit, a readiness level of the pilot based said using, wherein the aircraft is operated in accordance with the readiness level as assessed by the AI control unit.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Examples of the present disclosure provide systems and methods for assessing pilot readiness. The systems and methods provide a non-intrusive approach to predicting pilot readiness using machine learning, such as via a voting classifier and engineered features. The systems and methods include a control unit that receives a historical pilot schedule and readiness self-assessment data. In at least one example, the control unit employs various data analysis techniques such as correlation analysis, and data exploration to identify patterns indicative of pilot readiness. Along with these, dimensionality reduction, feature scaling, and feature selection techniques can be used to optimize performance of a particular model.

Figure 1:
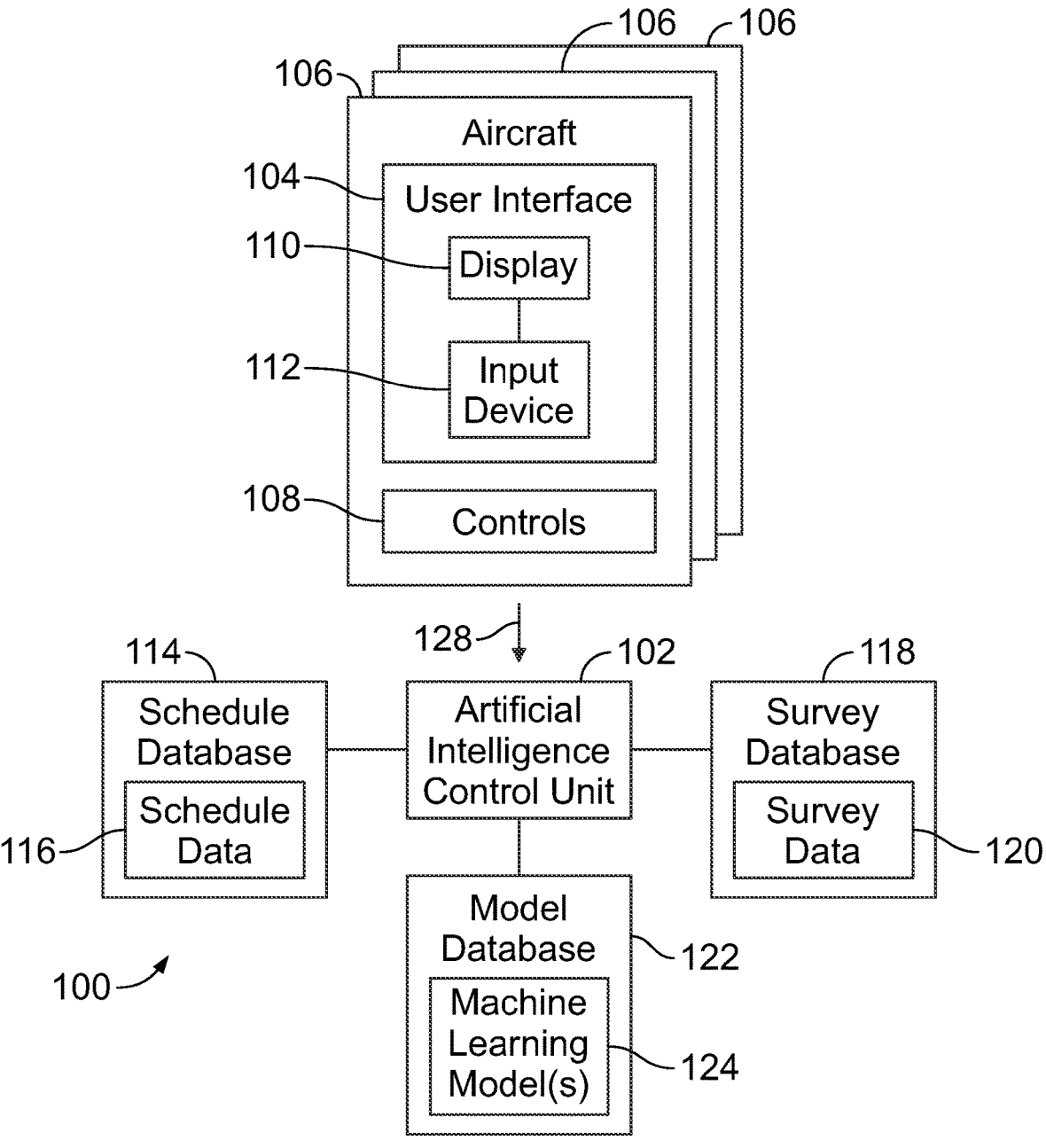
FIG. 1 illustrates a block diagram of a system, according to an example of the present disclosure.

FIG. 1 illustrates a block diagram of a system 100, according to an example of the present disclosure. The system 100 includes an artificial intelligence (AI) control unit 102 in communication with one or more user interfaces 104, which allow individuals, such as pilots, to input information. As shown, a user interface 104 can be onboard an aircraft 106, which travels between one or more departure airports and one or more arrival airports. Optionally, the user interface 104 can be remote from an aircraft 106, such as at a land-based location (for example, an airport lounge, a home of a pilot, and/or the like).

Each aircraft 106 includes controls 108 configured to allow an operator, such as a pilot, to control operation of the aircraft 106. For example, the controls 108 include one or more of a control handle, yoke, joystick, control surface controls, accelerators, decelerators, and/or the like.

In at least one example, the user interface 104, can be within a flight deck or cockpit of the aircraft 106. The user interface 104 includes a display 110 and an input device 112. The display 110 can be a monitor, screen, television, touch-screen, and/or the like. The input device 112 can include a keyboard, mouse, stylus, touchscreen interface (that is, the input device 112 can be integral with the display 110), and/or the like. The user interface 104 can be, or part of, a computer workstation. For example, the user interface 104 can be part of a flight computer within the flight deck or cockpit of the aircraft 106. As another example, the user interface 104 can be a handheld device, such as a smart phone, tablet, or the like.

The AI control unit 102 can be separate and distinct from the aircraft 106. For example, the AI control unit 102 can be at a central monitoring location, such as at an airport, or a location that is remote from the airport.

The AI control unit 102 is also in communication with a schedule database 114, such as through one or more wired or wireless connections. The schedule database 114 stores schedule data 116 for crews of the aircraft 106, which includes pilots of the aircraft 106. The schedule data 116 includes flight schedules for pilots for a predetermined time. For example, the schedule data 116 includes a schedule for a pilot for recent flights (such as a previous week, month, or year or past flights), and future flights (such as an upcoming week, month, or year of future flights).

The AI control unit 102 is also in communication with a survey database 118, such as through one or more wired or wireless connections. The survey database 118 stores survey data 120 includes surveys having various questions related to pilot readiness, such as with respect to an alert level, restfulness, fatigue level, and/or the like.

The AI control unit 102 is also in communication with a model database 122, such as through one or more wired or wireless connections. The model database 122 stores one or more machine learning models 124.

The AI control unit 102 can be co-located with one or more of the schedule database 114, the survey database 118, and/or the model database 122. As another example, the AI control unit 102 can be remotely located from the schedule database 114, the survey database 118, and/or the model database 122. In at least one other example, the AI control unit 102 can be onboard an aircraft 106.

In at least one example, the AI control unit 102 can also be in communication with the controls 108 of the aircraft 106, and configured to automatically operate one or more the controls 108, as described herein. Optionally, the AI control unit 102 may not be in communication with the controls 108, and may not be configured to automatically operate the aircraft 106.

In operation, the AI control unit 102 outputs a survey to the user interface 104. The survey is stored in the survey data 120 and includes numerous questions for a pilot of an aircraft 106 to answer. The AI control unit 102 presents the survey including the questions on the display 110. The pilot uses the input device 112 to answer the questions within the survey. The answers to the questions of the survey are output to the AI control unit 102 as survey answer data 128. The survey answer data 128 includes answers from the pilot in relation to the questions of the survey.

The AI control unit 102 also receives a schedule for the pilot who answered the questions to the survey. The schedule is within the schedule data 116 of the schedule database 114.

The AI control unit 102 analyzes the survey answer data 128 and the schedule for the pilot to assess a readiness level of the pilot. In at least one example, the AI control unit 102 analyzes the survey answer data 128 and the schedule for the pilot based on one or more machine learning models 124 stored in the model database 122. Examples of the machine learning models 124 includes logistic regression, Gaussian Naive Bayes (NB), Random Forest, Support Vector (SV)-Classifier, Decision Tree, K-Nearest Neighbor (KNN), Multi-Layer Perception (MLP)-Classifier, Adaptive Boosting (ADABoost)-Classifier, Gradient Boost (GB)-Classifier, and/or Extra Tree Classifier. Other types of machine learning models can be used.

In at least one example, the AI control unit 102 analyzes the survey answer data 128 and the schedule based on a single machine learning model 124 to assess a readiness level of a pilot. In at least one other example, the AI control unit 102 analyzes the survey answer data 128 and the schedule based on multiple machine learning models 124 (such as two or more of the aforementioned examples). In this example, the AI control unit 102 can assess such data based on multiple machine learning models 124 and select the results of one of the machine learning models 124 having an assessed, predetermined and/or desired reliability (such as based on an accuracy score, a precision score, and/or a recall score) to assess the readiness level of the pilot.

After the AI control unit 102 assesses the readiness level of the pilot using one or more of the machine learning models 124 to analyze the survey answer data 128 and the schedule of the pilot, the AI control unit 102 can show the assessed readiness level on the display 110. The assessed readiness level can be shown as a probability, such as a percentage. The assessed readiness level can be shown as a color coded indication. The assessed readiness level can be shown as a predetermined level of readiness (such as low, medium, or high), with an accompanying recommendation regarding whether and/or how the pilot should operate the aircraft 106 (such as with automatic flight aids).

The aircraft 106 is operated based on an assessed readiness level of the pilot. For example, if the AI control unit 102 assesses a low level of fatigue for the pilot, the pilot can then operate the aircraft 106 in a normal fashion. As another example, if the AI control unit 102 assesses a high level of fatigue for the pilot, the pilot can then refrain from operating the aircraft 106.

In at least one example, the readiness level of one or more pilots can be used by one or more operators of the aircraft to operate one or more aspects of the aircraft. The aircraft 106 can be operated according to the readiness level(s) of the pilot(s). As an example, a pilot having a high level of readiness (for example, little or no fatigue) can operate the aircraft 106 with little to no flight restrictions. As a level of readiness decreases, automatic operation of the controls 108 (such as via an autopilot system, and/or via the AI control unit 102) can be increased. Further, the readiness level(s) of the pilot(s) can be output to dispatchers, flight operations personnel, and/or the like, who can then schedule one or more pilots for flights. In at least one example, schedules can be automatically provided by the AI control unit 102 according to readiness levels of the pilots (for example, the AI control unit 102 may reduce flights of pilots exhibiting higher levels of fatigue).

In at least one example, the AI control unit 102 can automatically operate one or more aspects of the aircraft 106 (such as via one or more of the controls 108) based on the assessed readiness level of the pilot. For example, the AI control unit 102 can prevent the pilot from operating the controls 108 if the assessed readiness level is abnormally high. As another example, the AI control unit 102 can automatically operate one or more of the controls 108 (such as automatically operating an auto-pilot feature during a cruise phased on flight) based on the assessed readiness level of the pilot. As another example, the AI control unit 102 can automatically operate automatic flight control aids based on the assessed readiness level of the pilot. Optionally, the AI control unit 102 may not be configured to automatically operate the aircraft 106.

As described herein, the system 100 includes the AI control unit 102, which is configured to receive one or more schedules for one or more pilots of one or more aircraft 106. The AI control unit 102 is further configured to receive the survey answer data 128 from the pilot(s), and use one or more machine learning models 124 to analyze the schedules and the survey answer data 128. The AI control unit 102 is further configured to one or more readiness levels of the pilot(s) based on the schedule and the survey answer data 128. The aircraft 106 is/are operated in accordance with the one or more readiness level(s) as assessed by the AI control unit 102.

The user interface 104 is in communication with the AI control unit 102. The user interface 104 includes the display 110 in communication with the input device 112. The AI control unit 102 shows one or more surveys on the display 110. Answers to questions within the survey(s) are input by the pilot via the input device 112. The survey answer data 128 includes the answers.

Figure 2:
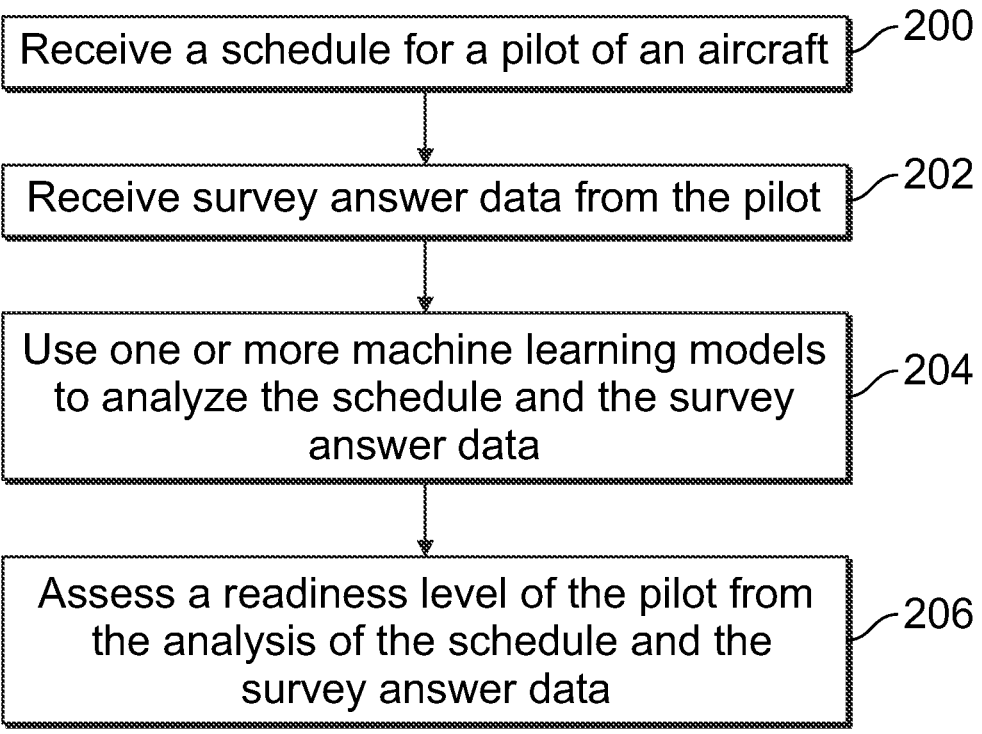
FIG. 2 illustrates a flow chart of a method, according to an example of the present disclosure.

FIG. 2 illustrates a flow chart of a method, according to an example of the present disclosure. Referring to FIGS. 1 and 2, at 200, the AI control unit 102 receives a schedule (included within the schedule data 116) for a pilot of an aircraft 106. At 202, the AI control unit receives survey answer data 128 from the pilot. At 204, the AI control unit 204 uses one or more machine learning models 124 to analyze the schedule and the survey answer data 128. At 206, the AI control unit 102 assesses a readiness level of the pilot based on the analysis in 204 of the schedule and the survey answer data 128.

In at least one example, the AI control unit 102 uses multiple machine learning models 124 to analyze the schedule and the survey answer data 128. Further, in at least one example, the AI control unit 102 uses a voting classifier approach, trained on historical pilot schedule and readiness self-assessment data, to predict pilot readiness levels. In so doing, the AI control unit 102 overcomes the limitations of existing approaches by offering a more tailored solution that accounts for the specific needs of pilots, while also eliminating, minimizing, or otherwise reducing the need for intrusive physiological data collection.

As noted, the AI control unit 102 receives the schedule for the pilot. Data within the schedule includes information on flight duration, time between flights, rest periods, and other relevant factors such as crew size, mission complexity, weather conditions during flights, and/or the like. Data regarding schedules can be received and stored in the schedule database 114 for each flight of the pilot. Information in the schedule for a pilot can include dates of flights, pilot identification information, departure airports, arrival airports, flight types, co-pilot information, other crew information, crew size, take-off times, landing times, aircraft models, and/or the like. In at least one example, the survey data 120 includes one or more electronic surveys, which provide a series of questions developed by subject matter experts that identify risk based on the United States Federal Aviation Administration (FAA) Pilot, Aircraft, Environment, and External Pressure (PAVE) checklist.

Figure 3:
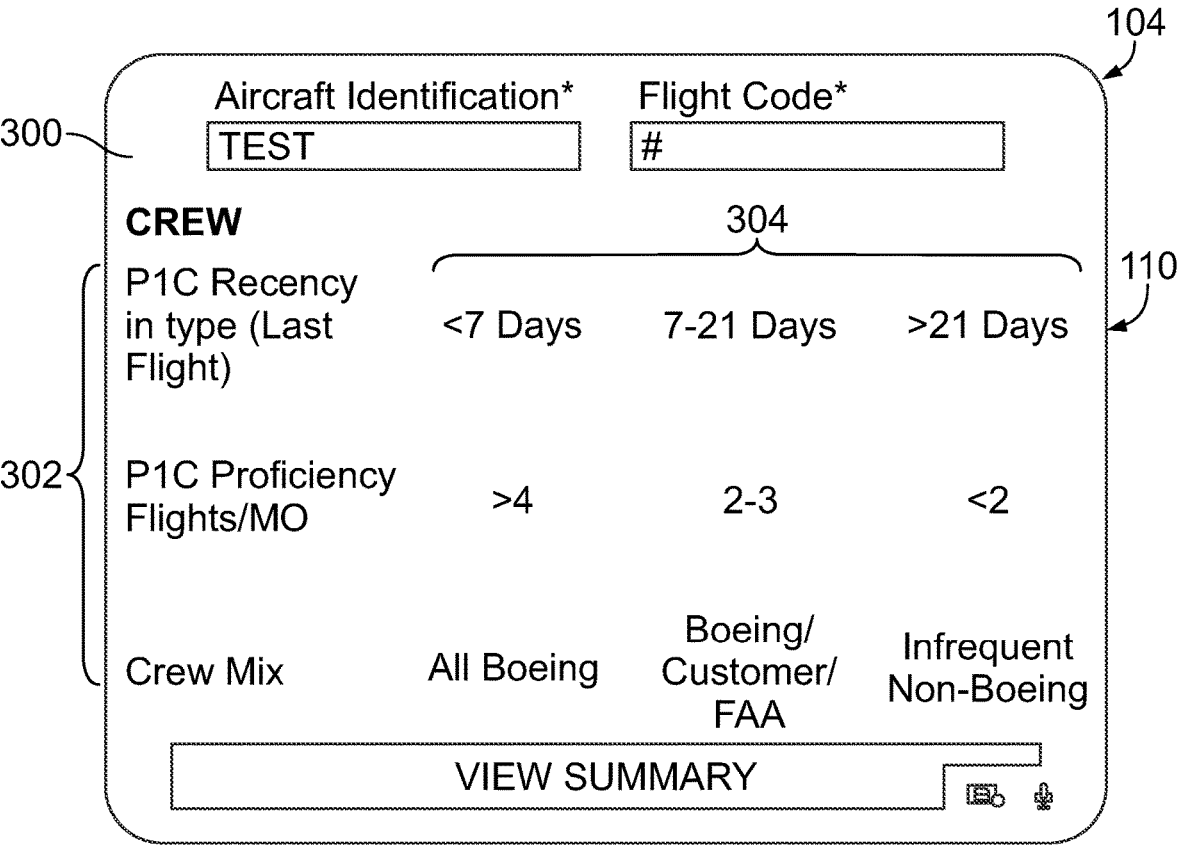
FIG. 3 illustrates a front view of a display of a user interface, according to an example of the present disclosure.
Figure 4:
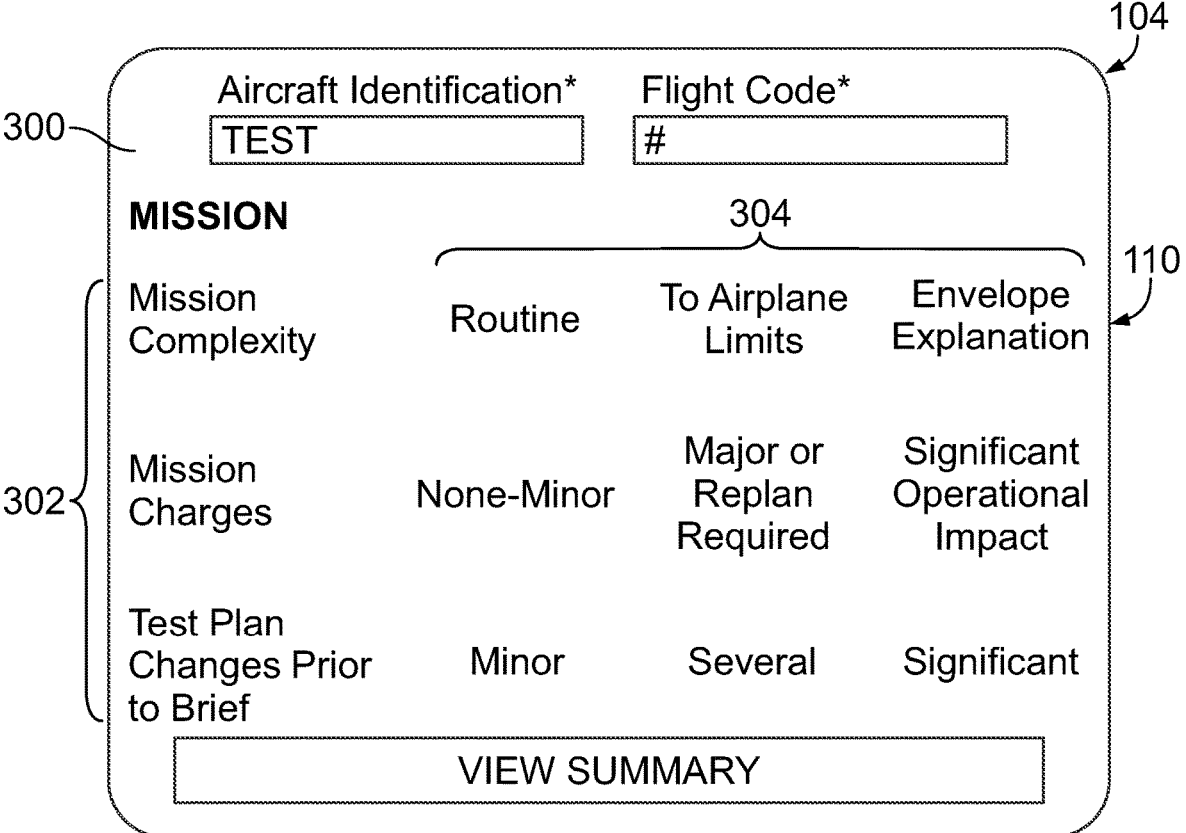
FIG. 4 illustrates a front view of a display of a user interface, according to an example of the present disclosure.

FIG. 3 illustrates a front view of a display 110 of a user interface 104, according to an example of the present disclosure. FIG. 4 illustrates a front view of the display 110 of the user interface 104. Referring to FIGS. 1-4, the AI control unit 102 shows electronic surveys on the display 110. The survey data 120 within the survey database 118 includes the electronic surveys. In at least one example, the surveys shown on the display 110 include a topic 300, questions 302 regarding the topic 300, and answer areas 304 for the questions 302. For example, a survey includes a topic 300 of crew, and questions regarding a pilot in charge, flight recency, proficiency, and crew mix. The pilot uses the input device 112 to answer each question 302 from selected answers in the answer areas 304. As another example, a survey includes a topic 300 of mission, and questions regarding mission complexity, mission changes, and changes. Additional topics, questions, and answer areas can be presented. Other examples include whether crew members are in training, mechanical issues (such as within respect to seating, flight controls, computers, and/or the like), configuration changes, delays, crew pairings, duty shift, consecutive days worked, runway conditions, weather conditions, collision hazards, intangibles, and/or the like. The aforementioned are merely examples of questions, and are non-limiting. The pilot answers each of the questions presented on the display 110, and the AI control unit 102 receives the answers in the survey answer data 128.

In at least one example, the AI control unit 102 merges the schedule for the pilot and the survey answer data 128 to identify features specifically related to pilot readiness. In this manner, the AI control unit 102 is configured to correlate historical schedules to readiness levels for each flight of the pilot.

In at least one example, the AI control unit 102 uses domain knowledge to identify factors that influence pilot readiness, such as flight duration, time between flights, rest periods, and other risk factors. Such variables are incorporated into the machine learning models 124 and capture underlying patterns in pilot readiness. Non-limiting examples of factors that influence pilot readiness include a number of crew, date and time of a flight, time from last flight, rolling mean of flight hours in last 5-10 flights, number of flights before a current flight, number of flights in a day, a week, a month, and/or a year, trend in flight hours for a previous number of flights (such as 5 or 10 flights), scheduled flight type, scheduled airports, scheduled time to next flight, and/or the like. In at least one example, the AI control unit 102 also uses correlation analysis to identify relationships between different features and their contribution to pilot readiness.

In at least one example, the AI control unit 102 employs data exploration techniques, such as visualizations and descriptive statistics, to gain insights into the data and identify any patterns or trends that may be useful for a machine learning model 124. This process helps in refining a feature set and guiding further feature engineering steps.

For example, the AI control unit 102 can determine a percentage of features that contributed toward a total risk. For example, the AI control unit 102 can determine that mission complexity, planned mission test risk, and intangible considerations contribute the most toward the total risk. As another example, the AI control unit 102 can determine that a percentage of moderate/high risk flights during early morning and late-night flights are higher than at other times. As another example, the AI control unit 102 can determine that a percentage of moderate/high risk flights is slightly higher on Monday, Tuesday and Thursday when compared to other weekdays. As another example, the AI control unit 102 can determine that a percentage of moderate/high risk flights are higher at particular airports.

In at least one example, the AI control unit 102 employs dimensionality reduction techniques to reduce the number of features in the dataset while preserving desired or otherwise important information. Dimensionality reduction techniques help in reducing noise and improving model performance.

In at least one example, the AI control unit 102 employs principal component analysis (PCA), which is a linear transformation technique that projects original data onto a lower-dimensional space. PCA aims to identify directions (or principal components) that capture the most variance in the data. In at least one example, the AI control unit 102 performs PCA to determine if a survey is sufficient for answers in various segments.

In at least one example, the AI control unit 102 employs linear discriminant analysis (LDA), which is a supervised dimensionality reduction technique that seeks to maximize separation between different classes. In at least one example, LDA aims to find a linear combination of features that best separates fatigued pilots from non-fatigued pilots.

In at least one example, the AI control unit 102 employs feature scaling to ensure that all features are on the same scale. Feature scaling makes it easier for a machine learning model to learn, and improve performance. The feature scaling can include minimum-maximum scaling, which is a normalization technique that rescales features to a specified range, and/or Z-score normalization, which rescales features to a have a mean of 0 and a standard deviation of 1.

In at least one example, the AI control unit 102 uses feature selection techniques to select desired features from the data, thereby reducing noise, and improving model performance. For example, recursive feature elimination (RFE) is a backward feature elimination technique that recursively removes the least important features, based on their importance in the model, until the desired number of features is reached. As another example, SelectKBest is a univariate feature selection technique that selects the top k features based on their relationship with the target variable, as determined by a scoring function (for example, chi-squared, ANOVA F-value).

In at least one example, the AI control unit 102 employs a voting classifier model. For example, the machine learning models 124 can include the voting classifier model. The voting classifier model is an ensemble learning technique that combines the predictions of multiple base classifiers to improve overall performance and reduce the likelihood of overfitting. The voting classifiers can achieve a higher accuracy than individual models on which they are based due to the fact that the voting process can balance out individual mistakes made by separate models and can handle outliers. Voting classifiers can help mitigate overfitting because they average the results of individual models, which can reduce the impact of models that have overfit the training data. By combining multiple models, a voting classifier can benefit from the strengths of each model and mitigate weaknesses of each model. Further voting classifiers are flexible because they can combine different machine learning models, including models of different types. For example, voting classifiers can combine a logistic regression model, a decision tree model, and a neural network in the same voting classifier.

In at least one example, the voting classifier model is trained using a preprocessed and optimized dataset. A combination of base classifiers, such as decision trees, support vector machines, and logistic regression, are used to build an ensemble model. The model is validated using techniques such as k-fold cross-validation to ensure generalizability and robustness.

To evaluate the performance of the voting classifier model, various metrics such as accuracy, precision, recall, F1 score, and the area under the receiver operating characteristic (ROC) curve are used. The primary attribute being considered in such approach can be a recall value, which is a measure of the proportion of actual positive cases (fatigued pilots) that were correctly identified by the model. To further optimize the recall value, techniques such as grid search and random search can be used to tune hyperparameters of the base classifiers and the voting classifier model.

It has been found that the voting classifier model, trained on the optimized dataset and using a combination of base classifiers, effectively predicts pilot readiness. The voting classifier model achieves high accuracy, precision, recall, and F1 score, thereby indicating its effectiveness in identifying fatigued pilots. The voting classifier model is specifically tailored to unique needs of pilots, addressing specific flight schedules and rest requirements. Such customization results in more accurate readiness predictions, as opposed to traditional tools that may not fully account for unique operational conditions. Additionally, the voting classifier model leverages historical pilot schedules and readiness self-assessment data, eliminating, minimizing, or otherwise reducing the need for intrusive physiological data collection. This not only simplifies the implementation process but also makes the voting classifier model practical for real-world flight scenarios.

As described herein, the system 100 includes an AI control unit 102, which provides a readiness assessment tool using a pilot surveys (past and present) and one or more schedules to assess (such as estimate, predict, or the like) readiness for pilots on a given flight. The AI control unit 102 uses one or more machine learning models 124, which can be tailored to understand pilot readiness by using relevant features (for example, answers regarding questions posed in surveys).

Figure 5:
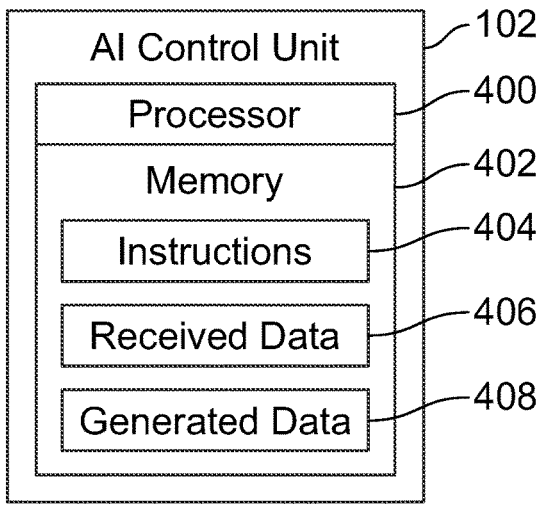
FIG. 5 illustrates a schematic block diagram of a control unit, according to an example of the present disclosure.

FIG. 5 illustrates a schematic block diagram of the AI control unit 102, according to an example of the present disclosure. In at least one example, the AI control unit 102 includes at least one processor 400 in communication with a memory 402. The memory 402 stores instructions 404, received data 406, and generated data 408. The AI control unit 102 shown in FIG. 5 is merely exemplary, and non-limiting.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the AI control unit 102 may be or include one or more processors that are configured to control operation, as described herein.

The AI control unit 102 is configured to execute a set of instructions that are stored in one or more data storage units or elements (such as one or more memories), in order to process data. For example, the AI control unit 102 may include or be coupled to one or more memories. The data storage units may also store data or other information as desired or needed. The data storage units may be in the form of an information source or a physical memory element within a processing machine.

The set of instructions may include various commands that instruct the AI control unit 102 as a processing machine to perform specific operations such as the methods and processes of the various examples of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of examples herein may illustrate one or more control or processing units, such as the AI control unit 102. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the AI control unit 102 may represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms may include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Referring to FIGS. 1-5, examples of the subject disclosure provide systems and methods that allow large amounts of data to be quickly and efficiently analyzed by a computing device. For example, the AI control unit 102 can analyze various schedules of numerous pilots and survey answers from the pilots during a particular time period. As such, large amounts of data, which may not be readily discernable by human beings, are being tracked and analyzed. The vast amounts of data are efficiently organized and/or analyzed by the AI control unit 102, as described herein. The AI control unit 102 analyzes the data in a relatively short time in order to quickly and efficiently assess readiness levels of the pilots. As such, examples of the present disclosure provide increased and efficient functionality, and vastly superior performance in relation to a human being analyzing the vast amounts of data.

In at least one example, components of the system 100, such as the AI control unit 102, provide and/or enable a computer system to operate as a special computer system for assessing pilot readiness. The AI control unit 102 improves upon standard computing devices by determining such information in an efficient and effective manner.

In at least one example, all or part of the systems and methods described herein may be or otherwise include an artificial intelligence (AI) or machine-learning system that can automatically perform the operations of the methods also described herein. For example, the AI control unit 102 is an artificial intelligence or machine learning system. These types of systems may be trained from outside information and/or self-trained to repeatedly improve the accuracy with how data is analyzed to determine pilot readiness. Over time, these systems can improve by determining and communicating with increasing accuracy and speed, thereby significantly reducing the likelihood of any potential errors. For example, the AI or machine-learning systems can learn and determine models (such as the machine learning models 124), and associate such models with assessments of pilot readiness. The AI or machine-learning systems described herein may include technologies enabled by adaptive predictive power and that exhibit at least some degree of autonomous learning to automate and/or enhance pattern detection (for example, recognizing irregularities or regularities in data), customization (for example, generating or modifying rules to optimize record matching), and/or the like. The systems may be trained and retrained using feedback from one or more prior analyses of the data, ensemble data, and/or other such data. Based on this feedback, the systems may be trained by adjusting one or more parameters, weights, rules, criteria, or the like, used in the analysis of the same. This process can be performed using the data and ensemble data instead of training data, and may be repeated many times to repeatedly improve the determinations and communications described herein. The training minimizes conflicts and interference by performing an iterative training algorithm, in which the systems are retrained with an updated set of data, and based on the feedback examined prior to the most recent training of the systems. This provides a robust analysis model that can better assess levels of readiness in a cost effective and efficient manner.

Figure 6:
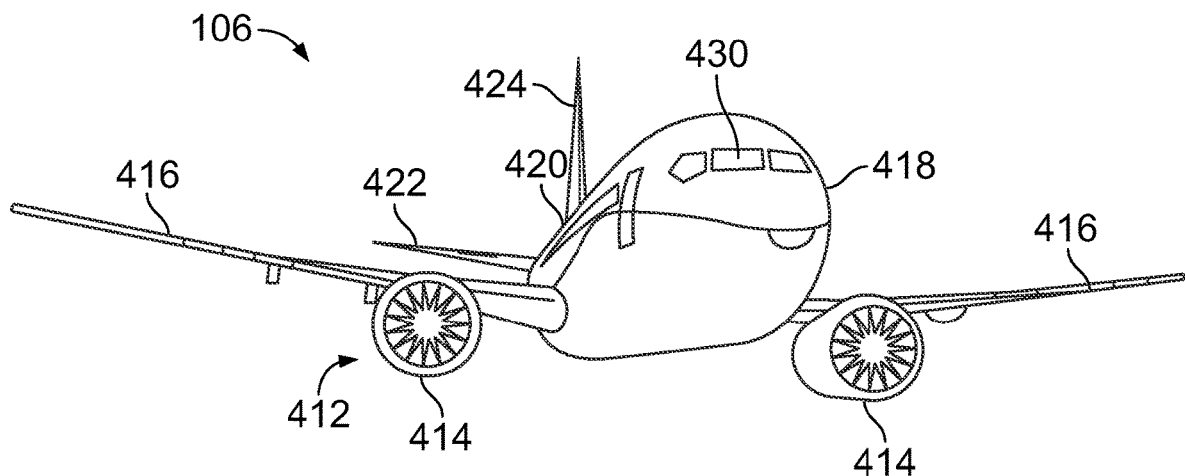
FIG. 6 illustrates a perspective front view of an aircraft, according to an example of the present disclosure.

FIG. 6 illustrates a perspective front view of an aircraft 106, according to an example of the present disclosure. The aircraft 106 includes a propulsion system 412 that includes engines 414, for example. Optionally, the propulsion system 412 may include more engines 414 than shown. The engines 414 are carried by wings 416 of the aircraft 106. In other examples, the engines 414 may be carried by a fuselage 418 and/or an empennage 420. The empennage 420 may also support horizontal stabilizers 422 and a vertical stabilizer 424. The fuselage 418 of the aircraft 106 defines an internal cabin 430, which includes a flight deck or cockpit, one or more work sections (for example, galleys, personnel carry-on baggage areas, and the like), one or more passenger sections (for example, first class, business class, and coach sections), one or more lavatories, and/or the like. FIG. 6 shows an example of an aircraft 106. It is to be understood that the aircraft 106 can be sized, shaped, and configured differently than shown in FIG. 6.

Further, the disclosure comprises examples according to the following clauses:

Clause 1. A system comprising:

an artificial intelligence (AI) control unit configured to:

receive a schedule for a pilot of an aircraft, receive survey answer data from the pilot, use one or more machine learning models to analyze the schedule and the survey answer data, and assess a readiness level of the pilot based on the schedule and the survey answer data, wherein the aircraft is operated in accordance with the readiness level as assessed by the AI control unit.

Clause 2. The system of Clause 1, further comprising a user interface in communication with the AI control unit, the user interface including a display in communication with an input device, wherein the AI control unit shows one or more surveys on the display, wherein answers to questions within the one or more surveys are input by the pilot via the input device, and wherein the survey answer data includes the answers.

Clause 3. The system of Clause 2, wherein the user interface is onboard the aircraft.

Clause 4. The system of Clauses 2 or 3, further comprising a survey database in communication with the AI control unit, wherein the survey database stores survey data including the one or more surveys.

Clause 5. The system of any of Clauses 1-4, further comprising a schedule database in communication with the AI control unit, wherein the schedule database stores schedule data including the schedule.

Clause 6. The system of any of Clauses 1-5, further comprising a model database in communication with the AI control unit, wherein the model database stores the one or more machine learning models.

Clause 7. The system of any of Clauses 1-6, wherein the one or more machine learning models comprises a plurality of machine learning models.

Clause 8. The system of Clause 7, wherein the AI control unit is further configured to select results of one of the plurality of machine learning models based on an assessed reliability.

Clause 9. The system of any of Clauses 1-8, wherein the one or more machine learning models comprise a voting classifier model.

Clause 10. The system of any of Clauses 1-9, wherein the AI control unit is further configured to automatically operate one or more aspects the aircraft based on the readiness level as assessed by the AI control unit.

Clause 11. A method comprising:

receiving, by an artificial intelligence (AI) control unit, a schedule for a pilot of an aircraft;

receiving, by the AI control unit, survey answer data from the pilot;

using, by the AI control unit, one or more machine learning models to analyze the schedule and the survey answer data; and assessing, by the AI control unit, a readiness level of the pilot based said using, wherein the aircraft is operated in accordance with the readiness level as assessed by the AI control unit.

Clause 12. The method of Clause 11, further comprising showing, by AI control unit, one or more surveys on a display of a user interface, wherein answers to questions within the one or more surveys are input by the pilot via the input device, and wherein the survey answer data includes the answers.

Clause 13. The method of Clause 12, further comprising storing, within a survey database in communication with the AI control unit, survey data including the one or more surveys.

Clause 14. The method of any of Clauses 11-13, further comprising storing, within a schedule database in communication with the AI control unit, schedule data including the schedule.

Clause 15. The method of any of Clauses 11-14, further comprising storing, within a model database in communication with the AI control unit, the one or more machine learning models.

Clause 16. The method of any of Clauses 11-15, wherein the one or more machine learning models comprises a plurality of machine learning models.

Clause 17. The method of Clause 16, further comprising selecting, by the AI control unit, results of one of the plurality of machine learning models based on an assessed reliability.

Clause 18. The method of any of Clauses 11-17, wherein the one or more machine learning models comprise a voting classifier model.

Clause 19. The method of any of Clauses 11-18, further comprising automatically operating one or more aspects the aircraft based on the readiness level as assessed by the AI control unit.

Clause 20. A non-transitory computer-readable storage medium comprising executable instructions that, in response to execution, cause one or more control units comprising a processor, to perform operations comprising:

receiving a schedule for a pilot of an aircraft;

receiving survey answer data from the pilot;

using one or more machine learning models to analyze the schedule and the survey answer data; and assessing a readiness level of the pilot based said using, wherein the aircraft is operated in accordance with the readiness level as assessed.

As described herein, examples of the present disclosure provide systems and methods for accurately assessing pilot readiness. Further, examples of the present disclosure provide tailored approaches to predicting and mitigating pilot fatigue.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system comprising:
a schedule database storing schedule data including a schedule for a pilot of an aircraft, wherein the schedule includes one or more previous flights flown by the pilot, and one or more future flights to be flown by the pilot; and
an artificial intelligence (AI) control unit in communication with the schedule database, the AI control unit configured to:
receive the schedule for the pilot of the aircraft,
receive survey answer data from the pilot, wherein the survey answer data includes answers to questions of a survey conducted before the pilot operates the aircraft, wherein the questions relate to pilot readiness to operate the aircraft, wherein the survey includes (a) one or more topics, (b) the questions regarding the one or more topics, and (c) answer areas for the questions,
use a plurality of machine learning models to analyze the schedule and the survey answer data,
select results of one of the plurality of machine learning models based on an assessed reliability, and
assess a readiness level of the pilot based on the schedule and the survey answer data,
wherein the aircraft is operated in accordance with the readiness level as assessed by the AI control unit.

2. The system of claim 1, further comprising a user interface in communication with the AI control unit, the user interface including a display in communication with an input device, wherein the AI control unit shows the survey on the display, and wherein the answers to the questions within the survey are input by the pilot via the input device.

3. The system of claim 2, wherein the user interface is onboard the aircraft.

4. The system of claim 2, further comprising a survey database in communication with the AI control unit, wherein the survey database stores survey data including the survey.

5. The system of claim 1, further comprising a model database in communication with the AI control unit, wherein the model database stores the one or more machine learning models.

6. The system of claim 1, wherein the one or more machine learning models comprise a voting classifier model.

7. The system of claim 1, wherein the AI control unit is further configured to automatically operate one or more aspects the aircraft based on the readiness level as assessed by the AI control unit.

8. A method comprising:
storing, in a schedule database, schedule data including a schedule for a pilot of an aircraft, wherein the schedule includes one or more previous flights flown by the pilot, and one or more future flights to be flown by the pilot; and
receiving, by an artificial intelligence (AI) control unit in communication the schedule database, the schedule for the pilot of the aircraft;
receiving, by the AI control unit, survey answer data from the pilot, wherein the survey answer data includes answers to questions of a survey conducted before the pilot operates the aircraft, wherein the questions relate to pilot readiness to operate the aircraft, wherein the survey includes (a) one or more topics, (b) the questions regarding the one or more topics, and (c) answer areas for the questions;
using, by the AI control unit, a plurality of machine learning models to analyze the schedule and the survey answer data;
selecting, by the AI control unit, results of one of the plurality of machine learning models based on an assessed reliability; and
assessing, by the AI control unit, a readiness level of the pilot based on said using,
wherein the aircraft is operated in accordance with the readiness level as assessed by the AI control unit.

9. The method of claim 8, further comprising showing, by AI control unit, the survey on a display of a user interface, and wherein answers to questions within the survey are input by the pilot via the input device.

10. The method of claim 9, further comprising storing, within a survey database in communication with the AI control unit, survey data including the survey.

11. The method of claim 8, further comprising storing, within a model database in communication with the AI control unit, the machine learning models.

12. The method of claim 8, wherein the machine learning models comprise a voting classifier model.

13. The method of claim 8, further comprising automatically operating one or more aspects the aircraft based on the readiness level as assessed by the AI control unit.

14. A non-transitory computer-readable storage medium comprising executable instructions that, in response to execution, cause one or more control units comprising a processor, to perform operations comprising:
receiving a schedule for a pilot of an aircraft, wherein the schedule includes one or more previous flights flown by the pilot, and one or more future flights to be flown by the pilot, wherein the schedule data is stored in a schedule database;

receiving survey answer data from the pilot, wherein the survey answer data includes answers to questions of a survey conducted before the pilot operates the aircraft, wherein the questions relate to pilot readiness to operate the aircraft, wherein the survey includes (a) one or more topics, (b) the questions regarding the one or more topics, and (c) answer areas for the questions;

using a plurality of machine learning models to analyze the schedule and the survey answer data;

selecting results of one of the plurality of machine learning models based on an assessed reliability; and assessing a readiness level of the pilot based said using, wherein the aircraft is operated in accordance with the readiness level as assessed.

15. The system of claim 1, wherein the one or more topics comprise:

a crew, wherein the questions include crew questions regarding a pilot in charge, flight recency, proficiency, and crew mix, and mission, wherein the questions include mission questions regarding mission complexity and mission changes.

16. The non-transitory computer-readable storage medium of claim 14, further comprising showing the survey on a display of a user interface.

17. The non-transitory computer-readable storage medium of claim 16, wherein answers to questions within the survey are input by the pilot via the input device.

18. The non-transitory computer-readable storage medium of claim 14, wherein survey data including the survey is stored within a survey database.

19. The non-transitory computer-readable storage medium of claim 14, wherein the machine learning models are stored within a model database.

20. The non-transitory computer-readable storage medium of claim 14, wherein the machine learning models comprise a voting classifier model.

21. The non-transitory computer-readable storage medium of claim 14, further comprising automatically operating one or more aspects the aircraft based on the readiness level.

\* \* \* \* \*